United States Patent
Oya et al.

(10) Patent No.: US 10,396,690 B2
(45) Date of Patent: Aug. 27, 2019

(54) ELECTRIC MOTOR, BLOWER, AND AIR CONDITIONER

(71) Applicant: Mitsubishi Electric Corporation, Tokyo (JP)

(72) Inventors: Junichiro Oya, Tokyo (JP); Tomoaki Oikawa, Tokyo (JP); Mineo Yamamoto, Tokyo (JP); Hiroyuki Ishii, Tokyo (JP); Hiroki Aso, Tokyo (JP); Yuto Urabe, Tokyo (JP); Kazunori Hatakeyama, Tokyo (JP); Takuya Shimomugi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 20 days.

(21) Appl. No.: 15/743,302

(22) PCT Filed: Oct. 30, 2015

(86) PCT No.: PCT/JP2015/080794
§ 371 (c)(1),
(2) Date: Jan. 10, 2018

(87) PCT Pub. No.: WO2017/072965
PCT Pub. Date: May 4, 2017

(65) Prior Publication Data
US 2018/0198390 A1  Jul. 12, 2018

(51) Int. Cl.
*H02P 6/17* (2016.01)
*H02K 29/08* (2006.01)
(Continued)

(52) U.S. Cl.
CPC ........... *H02P 6/17* (2016.02); *F24F 11/30* (2018.01); *F24F 11/88* (2018.01); *H02K 5/08* (2013.01);
(Continued)

(58) Field of Classification Search
CPC ........ H02P 6/153; H02P 27/085; H02P 6/085; H02P 6/17; F24F 11/30; H02K 11/33; H02K 2211/03; H02K 29/08
See application file for complete search history.

(56) References Cited

U.S. PATENT DOCUMENTS 3,696,278 A * 10/1972 Kuniyoshi ............... H02P 6/06
                                                         318/400.11
5,157,613 A * 10/1992 Williams .............. F02D 41/005
                                                         123/406.23
(Continued)

FOREIGN PATENT DOCUMENTS

CN       101325392 A    12/2008
JP       2000-069788 A    3/2000
(Continued)

OTHER PUBLICATIONS

International Search Report of the International Searching Authority dated Jan. 19, 2016 for the corresponding international application No. PCT/JP2015/080794 (and English translation).

(Continued)

*Primary Examiner* — Thai T Dinh
(74) *Attorney, Agent, or Firm* — Posz Law Group, PLC

(57) ABSTRACT

An electric motor includes a stator, a rotor provided to be rotatable with respect to the stator, and a driving circuit board including a power IC applying a driving voltage to the stator, a Hall IC detecting a rotation position of the rotor, and a control IC adjusting a phase of the driving voltage in accordance with a magnetic-pole-position signal from the Hall IC and rotation speed information calculated on the basis of the magnetic-pole-position signal. The Hall IC is provided at a position at which an advance angle is larger than zero when a rotation speed of the rotor is zero.

18 Claims, 15 Drawing Sheets

(51) Int. Cl.
  *H02P 6/30*    (2016.01)
  *F24F 11/88*   (2018.01)
  *F24F 11/30*   (2018.01)
  *H02K 5/08*    (2006.01)
  *H02P 27/08*   (2006.01)
  *H02K 11/33*   (2016.01)
  *H02P 6/15*    (2016.01)
  *H02P 6/08*    (2016.01)

(52) U.S. Cl.
  CPC ............ *H02K 11/33* (2016.01); *H02K 29/08* (2013.01); *H02P 6/153* (2016.02); *H02P 6/30* (2016.02); *H02P 27/085* (2013.01); *H02K 2211/03* (2013.01); *H02P 6/085* (2013.01)

(56) References Cited

U.S. PATENT DOCUMENTS

| | | | | |
|---|---|---|---|---|
| 8,004,220 | B2* | 8/2011 | Sparey | H02P 6/182 |
| | | | | 318/400.14 |
| 9,660,560 | B2* | 5/2017 | Kemp | H02P 21/0089 |
| 2006/0006828 | A1* | 1/2006 | Kimura | H02K 16/02 |
| | | | | 318/716 |
| 2010/0195784 | A1 | 8/2010 | Hirata et al. | |
| 2014/0225546 | A1 | 8/2014 | Sato | |
| 2015/0121929 | A1 | 5/2015 | Yamada et al. | |

FOREIGN PATENT DOCUMENTS

| | | |
|---|---|---|
| JP | 2001-045787 A | 2/2001 |
| JP | 2007-074796 A | 3/2007 |
| JP | 2007-322227 A | 12/2007 |
| JP | 2010-028892 A | 2/2010 |
| JP | 2011-114995 A | 6/2011 |
| JP | 2011-239541 A | 11/2011 |
| JP | 2012-210059 A | 10/2012 |
| JP | 2013-132200 A | 7/2013 |
| JP | 2013-165563 A | 8/2013 |
| JP | 2015-089198 A | 5/2015 |
| JP | 2015-171200 A | 9/2015 |
| WO | 2013/183168 A1 | 12/2013 |

OTHER PUBLICATIONS

Office Action dated Feb. 12, 2019 issued in corresponding JP patent application No. 2017-547327 (and English translation.
Office action dated Jun. 29, 2018 issued in corresponding Australian patent application No. 2015413519.
Office action dated Jul. 24, 2018 issued in corresponding JP patent application No. 2017-547327 (and English machine translation thereof).
Office Action dated Apr. 28, 2019 issued in corresponding Chinese patent application No. 201580082719.7 (and English machine translation).
Office action dated May 3, 2019 issued in corresponding EP patent application No. 15907329.5.

* cited by examiner (a) CONVENTIONAL TECHNIQUE (b) INVENTION OF PRESENT APPLICATION

US 10,396,690 B2

ELECTRIC MOTOR, BLOWER, AND AIR CONDITIONER

CROSS REFERENCE TO RELATED APPLICATION

This application is a U.S. national stage application of International Patent Application No. PCT/JP2015/080794 filed on Oct. 30, 2015, the disclosure of which is incorporated herein by reference.

TECHNICAL FIELD

The present invention relates to an electric motor including a board on which a circuit component is mounted, and also relates to a blower and an air conditioner that include the electric motor.

BACKGROUND

When an electric motor is rotationally driven, as the rotational speed of the electric motor increases, the energizing timing is delayed due to the influence of armature reaction and the like. Thus, for example, a technology is disclosed in which an advance angle value in accordance with a speed-command voltage is derived and driving of an electric motor is controlled by using the derived advance angle value (hereinafter, "advance angle control") (for example, Patent Literature 1 listed below).

In the advance angle control, it is typical to have a configuration in which information on an optimum-phase advance angle that is in accordance with the rotation speed of an electric motor is saved as a table and a microcomputer or a dedicated control IC controls the electric motor on the basis of the information on the optimum-phase advance angle characteristics stored in the table. The optimum-phase advance angle (also referred to as "optimum advance angle") is an advanced phase angle at which operational efficiency of an electric motor becomes maximum. The "phase angle" described herein is a phase difference between the voltage induced by a stator winding (hereinafter, "induced voltage") and the voltage applied to the stator winding from an inverter IC (hereinafter, "applied voltage"). When the applied voltage leads the induced voltage, the advance angle has a positive value.

PATENT LITERATURE

Patent Literature 1: Japanese Patent Application Laid-open No. 2011-114995

The background related to the advance angle control is as described above. The rotation speed of an electric motor varies due to variations in the advance angle. Thus, when hunting of the rotation speed occurs due to control of increasing and reducing the rotation speed, this leads to a downward spiral where the advance angle varies due to the hunting and the rotation speed also varies due to the variations in the advance angle. This may destabilize the rotation of a load driven by the electric motor. If advance angle control is executed on an electric motor by a microcomputer, this results in a significant cost increase. Thus, it is desirable to execute advance angle control on an electric motor by using a control IC, which is relatively low in cost.

SUMMARY

The present invention has been achieved to solve the above problems, and an object of the present invention is to provide an electric motor, a blower, and an air conditioner that can stabilize rotational control performed on a load while suppressing a cost increase.

In order to solve the above problems and achieve the object, an electric motor according to an aspect of the present invention includes a stator; a rotor provided to be rotatable with respect to the stator; and a board including a driving element applying a driving voltage to the stator, a magnetic-pole-position sensor detecting a rotation position of the rotor, and a control element adjusting a phase of the driving voltage in accordance with a magnetic-pole-position signal from the magnetic-pole-position sensor and rotation speed information calculated on a basis of the magnetic-pole-position signal. The magnetic-pole-position sensor is provided at a position at which an advance angle is larger than zero when a rotation speed of the rotor is zero.

The present invention has an effect where it is possible to stabilize rotational control performed on a load while suppressing a cost increase.

DETAILED DESCRIPTION

An electric motor, a blower, and an air conditioner according to an embodiment of the present invention will be described in detail below with reference to the accompanying drawings. The present invention is not limited to the embodiment.

Embodiment

Figure 1:
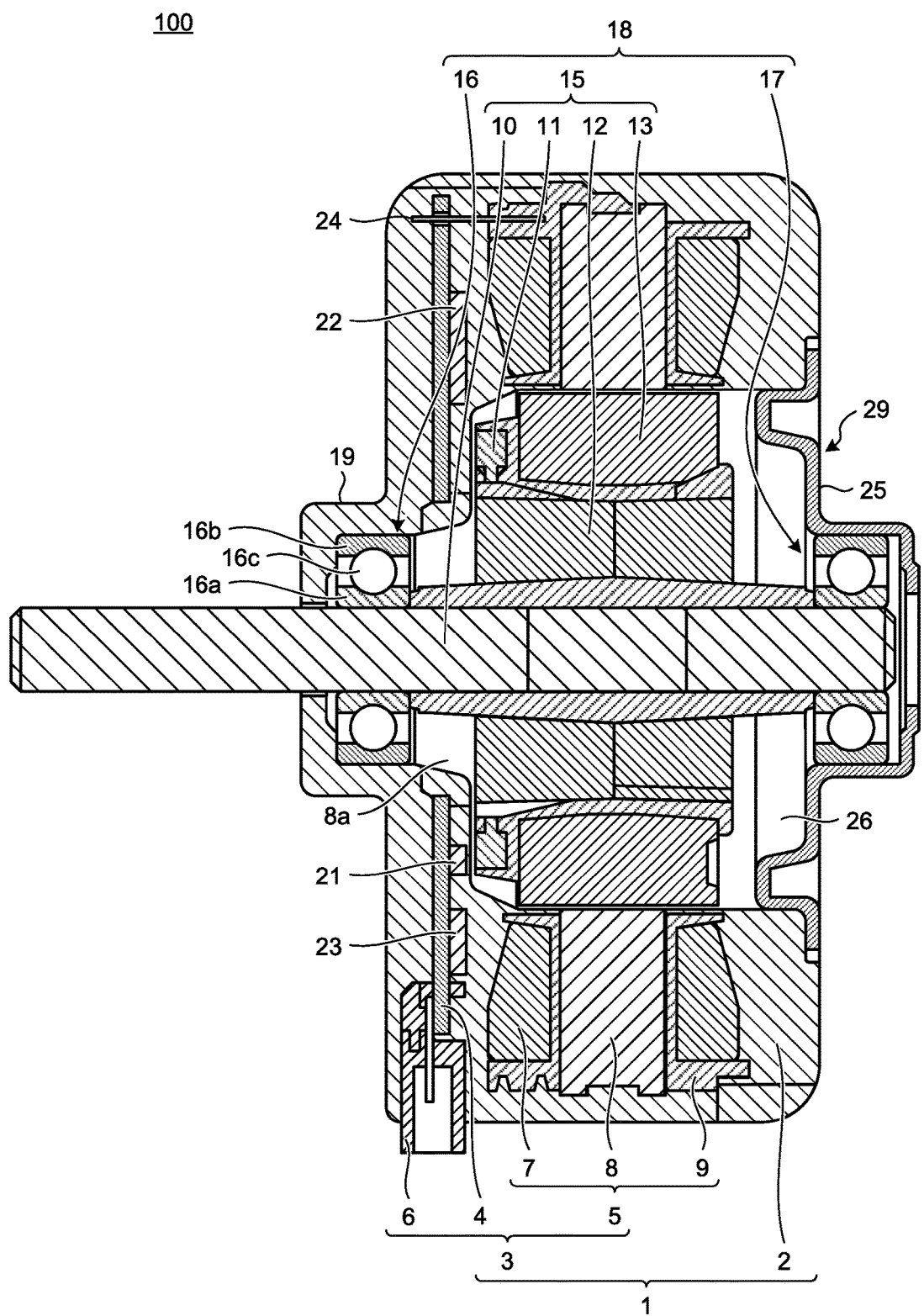
FIG. 1 is a side cross-sectional view of an electric motor according to a present embodiment.
Figure 2:
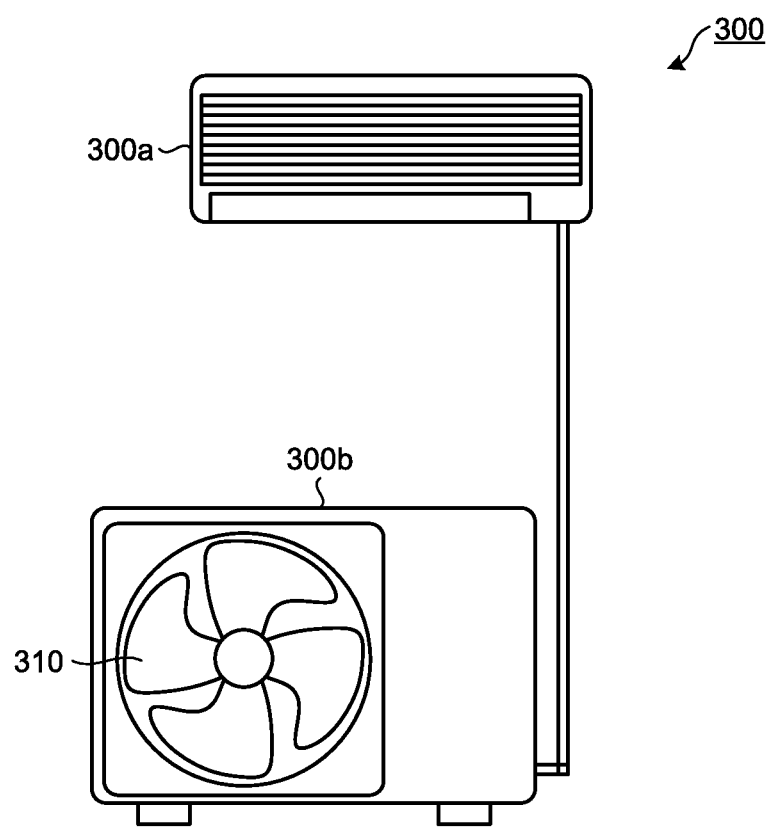
FIG. 2 is an external appearance diagram illustrating an air conditioner in which the electric motor according to the present embodiment is installed.

FIG. 1 is a side cross-sectional view of an electric motor according to a present embodiment. FIG. 2 is an external appearance diagram illustrating an air conditioner in which the electric motor according to the present embodiment is installed.

An air conditioner 300 illustrated in FIG. 2 includes an indoor unit 300a and an outdoor unit 300b connected to the indoor unit 300a. A fan for an indoor unit (not illustrated) is installed in the indoor unit 300a. A fan 310 for an outdoor unit is installed in the outdoor unit 300b. An electric motor 100 illustrated in FIG. 1 is used as a driving source of these fans. FIG. 2 illustrates, as an example, an air conditioner in which the electric motor according to the present embodiment is used; however, this is not a limitation. For example, it is also possible to use the electric motor according to the present embodiment for a blower.

Next, the configuration of the electric motor 100 according to the present embodiment will be described. As illustrated in FIG. 1, the main configuration of the electric motor 100 configured to include a molded stator 1, a rotor assembly portion 18, and a bracket 25. For example, the electric motor 100 is an inverter-driven brushless DC motor.

A shaft 10, which serves as a rotational shaft of the electric motor 100, extends through the central portion of the rotor assembly portion 18. A load for the electric motor 100 is mounted on the shaft 10 of the electric motor 100. In the air conditioner illustrated in FIG. 2, a fan for an indoor unit or the fan 310 for an outdoor unit is mounted on the shaft 10 as a load.

The molded stator 1 is formed into a cylindrical shape centered on the axis of the shaft 10. The molded stator 1 is constituted by a stator assembly portion 3 and a molded resin portion 2 filled with mold resin.

The stator assembly portion 3 is a portion where a stator 5, a driving circuit board 4, and a connector 6 among the constituent elements of the electric motor 100 are integrally molded. Hall ICs 21, a power IC 22, and a control IC 23 that are surface mount components are mounted on the driving circuit board 4. In the following descriptions, the circuit components mounted on the driving circuit board 4 are referred to as "driving-circuit components". A microcomputer is not mounted on the driving circuit board 4 in the present embodiment. It is possible to integrally mold the driving circuit board 4 and the stator 5 by mechanically coupling the driving circuit board 4 with the stator 5 by using the molded resin portion 2. That is, the driving circuit board 4 is sealed integrally with the stator 5 by using mold resin. This improves the heat radiation property of the power IC mounted on the driving circuit board 4 and increases the maximum output of the power IC 22. As the heat radiation property of the power IC 22 is improved, loss of the electric motor 100 is reduced. However, because the driving circuit board 4 and the like have a weak structure, low-pressure molding is desirable. Thus, thermosetting resin such as unsaturated polyester resin is preferable as mold resin to be used for the molded resin portion 2 intended to integrally mold the driving circuit board 4 and the stator 5. The driving circuit components are described later in detail.

The molded resin portion 2 constitutes the outside body of the electric motor 100 while constituting a housing 19 on the board side of the molded stator 1. The housing 19 supports a load-side bearing 16 by surrounding its outer ring.

The molded resin portion 2 is provided with a mortar-shaped recess portion 26, which is formed such that the rotor assembly portion 18 can be accommodated into the molded stator 1 from an opening 29 provided on a side (on the right side in FIG. 1, hereinafter referred to as "counter-load side") opposite the side (hereinafter, referred to as "load side") on which a load such as a fan is mounted. In FIG. 1, the opening 29 is a section where the bracket 25 is provided. The bracket 25 is manufactured by, for example, pressing a conductive metal material.

The stator 5 includes a winding 7, a stator iron core 8, and an insulator 9. The stator iron core 8 is manufactured by stacking, realized by crimping, welding, bonding, or the like, electromagnetic steel sheets that are stamped into strips with a thickness of approximately 0.1 mm to 0.7 mm. This strip-shaped stator iron core 8 includes a plurality of teeth (not illustrated). The insulator 9 is formed on the teeth. The insulator 9 is molded integrally with or separately from the stator iron core 8 by using thermoplastic resin such as polybutylene terephthalate (PBT). A concentrated winding 7 is wound around the teeth on which the insulator 9 is formed. For example, a three-phase single Y-connection winding is formed by connecting a plurality of concentrated windings 7. However, a distributed winding is also allowable.

The rotor assembly portion 18 is a portion where a rotor 15, the load-side bearing 16, and a counter-load-side bearing 17 among the constituent elements of the electric motor 100 are combined.

The rotor 15 is configured to include the shaft 10; an annular rotor insulating portion 12 provided on the outer peripheral portion of the shaft 10; a rotor magnet 13, which is a permanent magnet provided on the outer peripheral side of the rotor insulating portion 12 and located to face the stator iron core 8; and a position detecting magnet 11 provided between the rotor magnet 13 and the driving circuit board 4 in an axial direction of the shaft 10.

The rotor 15 is rotatable about the shaft 10. The rotor 15 obtains rotational force induced by the rotating magnetic field in the stator iron core 8 and transmits torque to the shaft 10 to drive a load connected directly or indirectly to the shaft 10.

The rotor insulating portion 12 is provided to insulate the shaft 10 from the rotor magnet 13 and also to insulate the shaft 10 from the stator iron core 8. The rotor magnet 13, the shaft 10, and the position detecting magnet 11 are integrally formed by using the rotor insulating portion 12 formed by mold injection by using a vertical-type molding machine. Thermoplastic resin is used for the rotor insulating portion 12. Examples of thermoplastic resin include polybutylene terephthalate (PBT) and polyphenylene sulfide (PPS); however, PBT or PPS admixed with glass filler is also preferable. The rotor insulating portion 12 constitutes a dielectric layer.

A resin magnet, a rare-earth magnet, or a ferrite sintered magnet formed by molding a thermoplastic resin mixed with a magnetic material is used as the rotor magnet 13. Examples of the rare-earth magnet include neodymium and samarium iron.

In the axial direction of the shaft 10, the load-side bearing 16 is attached to the shaft 10 on the load side (on the left side in FIG. 1). The counter-load-side bearing 17 is attached to the shaft 10 on the counter-load side (on the right side in FIG. 1). The shaft 10 is rotatably supported by the load-side bearing 16 and the counter-load-side bearing 17.

The load-side bearing 16 is, for example, a ball bearing. The load-side bearing 16 is configured to include an inner ring 16a, which rotates in unison with the shaft 10; an outer ring 16b fitted into the inner peripheral surface of the housing 19; a plurality of rolling bodies 16c located between the inner and outer rings; a lubricant (not illustrated) intended to smoothly roll the rolling bodies 16c; and a sealing plate (not illustrated) intended to seal the lubricant within the load-side bearing 16. It is typical that the inner ring 16a, the outer ring 16b, the rolling bodies 16c, and the sealing plate are made of conductive metal such as iron. The sealing plate is fixed to the outer ring and rotates with the outer ring. The sealing plate is electrically connected to the outer ring but it is not in contact with the inner ring.

The counter-load-side bearing 17 is configured in the same manner as the load-side bearing 16. The constituent elements of the counter-load-side bearing 17 are identical to or equivalent to those of the load-side bearing 16. Thus, detailed descriptions thereof are omitted.

When the rotor assembly portion 18 is inserted into the recess portion 26 from the opening 29 of the molded stator 1, the load-side bearing 16 attached to the shaft 10 is fitted into the housing 19. One end of the shaft 10 on the side where the load-side bearing 16 is located extends through the housing 19. The aforementioned fan or the like is attached to the shaft 10. In contrast, the counter-load-side bearing 17 is attached to the other end of the shaft 10. The bracket 25 is press-fitted into the inner peripheral portion of the molded resin portion 2 in such a manner as to seal the opening 29. At this time, the counter-load-side bearing 17 is fitted into the bracket 25 on its inner side.

A through hole 8a, through which the shaft 10 and the load-side bearing 16 pass, is formed in the driving circuit board 4. The driving circuit board 4 formed with the through hole 8a is held by the insulator 9. The driving circuit board 4 is located between the load-side bearing 16 and the winding 7 in the axial direction of the shaft 10, and is arranged perpendicular to the axial direction. The term "perpendicular" does not necessarily mean 90 degrees with respect to the axial direction of the shaft 10, and the angle formed by the driving circuit board 4 and the axial direction may deviate from 90 degrees.

Figure 3:
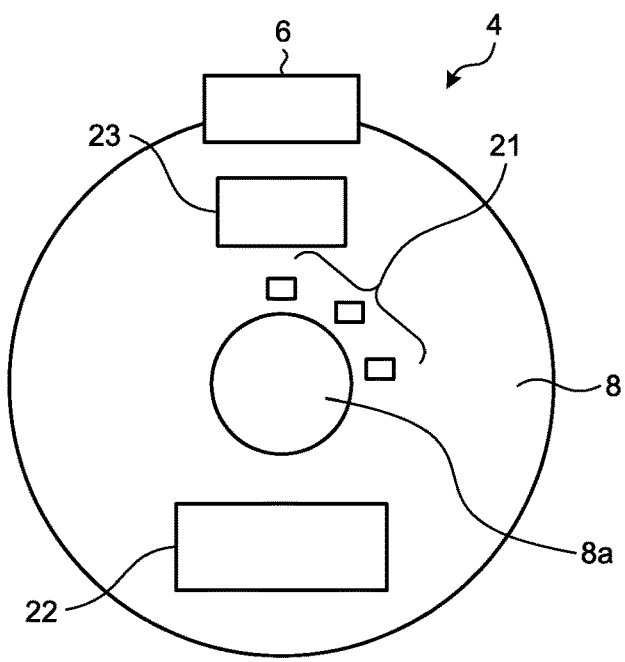
FIG. 3 is a plan view of circuit components mounted on a driving circuit board according to the present embodiment as viewed from a counter-load side.
Figure 4:
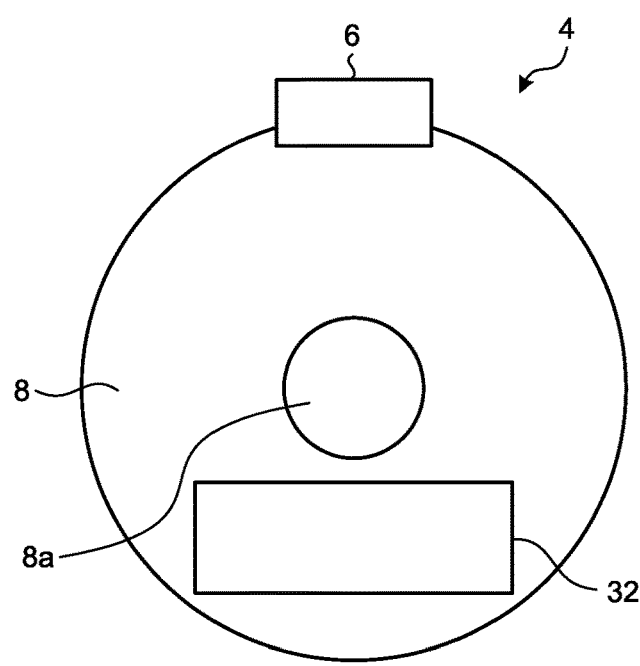
FIG. 4 is a plan view of the circuit components mounted on the driving circuit board according to the present embodiment as viewed from a load side.
Figure 5:
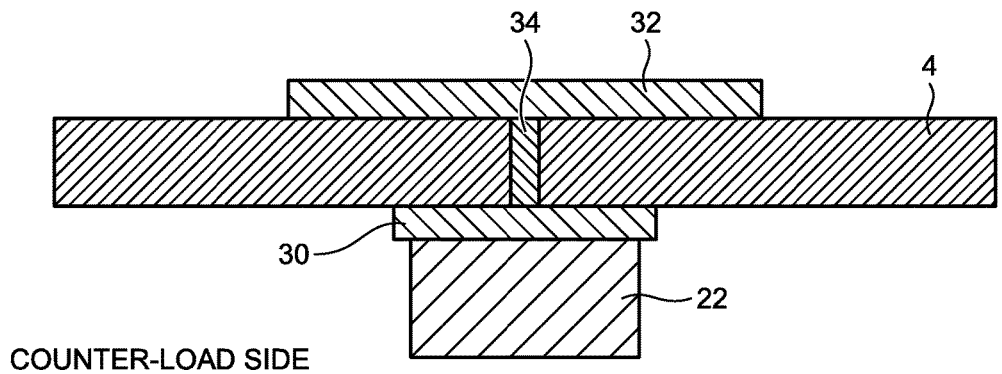
FIG. 5 is a partial cross-sectional view of a portion of the driving circuit board according to the present embodiment, where a power IC is mounted.
Figure 6:
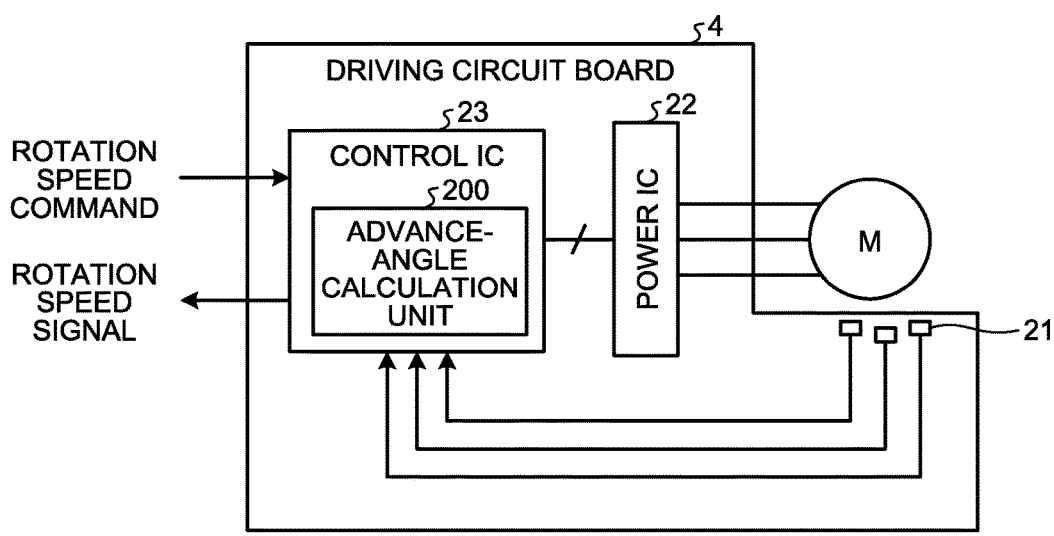
FIG. 6 is a block diagram illustrating an electrical connection relation between driving circuit components according to the present embodiment.
Figure 7:
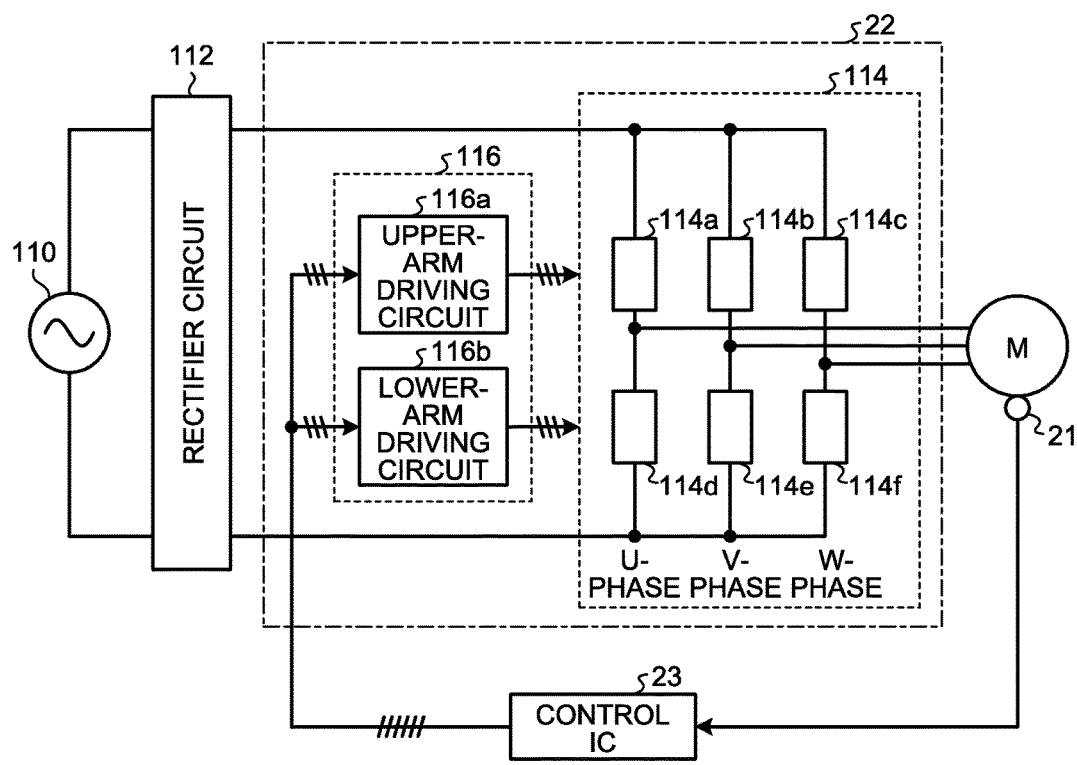
FIG. 7 is a circuit diagram illustrating an internal configuration of the power IC according to the present embodiment.

Next, the driving circuit components mounted on the driving circuit board 4 will be described in detail with reference to FIG. 3 to FIG. 7. FIG. 3 is a plan view of circuit components arranged on the driving circuit board 4 illustrated in FIG. 1, as viewed from the counter-load side. FIG. 4 is a plan view of the driving circuit board 4, as viewed from the load side. FIG. 5 is a partial cross-sectional view of a portion of the driving circuit board 4 where the power IC 22 is mounted. FIG. 6 is a block diagram illustrating an electrical connection relation between the driving circuit components. FIG. 7 is a circuit diagram illustrating an internal configuration of the power IC 22.

As illustrated in FIG. 3, the Hall ICs 21, the power IC 22, and the control IC 23 are mounted on the counter-load side of the driving circuit board 4, i.e., on the stator side. The Hall ICs 21 are magnetic-pole-position sensors that detect the rotation position of the rotor 15. A Hall element is a typical example of the Hall ICs 21. The power IC 22 is a driving element that applies a driving voltage to the winding 7 of the stator 5. As illustrated in FIG. 5, the power IC 22 is mounted on the driving circuit board 4 with a heat radiation pattern 30, which is a first heat radiation pattern, therebetween. The control IC 23 is a control element that generates Pulse Width Modulation (PWM) signals for performing PWM control on the power IC 22 on the basis of information detected by the Hall ICs 21. It is also possible to form the power IC 22 and the control IC 23 into a single driving IC.

Meanwhile, a heat radiation pattern 32, which is a second heat radiation pattern that radiates heat generated in the power IC 22, is provided on the load side of the driving circuit board 4 as illustrated in FIG. 4. As illustrated in FIG. 5, the power IC 22 and the heat radiation pattern 32 are connected via the heat radiation pattern 30 and a through hole 34. The heat radiation pattern 30 is formed from metal with high thermal conductivity and the through hole 34 is filled with metal with high thermal conductivity in order to facilitate transfer of heat generated in the power IC 22. Examples of metal with high thermal conductivity include copper and silver. The layout positions of the connector 6, the Hall ICs 21, the power IC 22, and the control IC 23 illustrated in FIG. 3 to FIG. 5 are merely an example. Other layouts are obviously allowable. However, the positions of the Hall ICs 21 are determined in accordance with the rotation speed of the rotor 15, and details thereof will be described later.

The Hall ICs 21, the power IC 22, and the control IC 23 mounted on the driving circuit board 4 are connected to each other as illustrated in FIG. 6 to drive the electric motor 100. More specifically, the control IC 23 receives a magnetic-pole-position signal that is a signal including position information on the rotor 15 (hereinafter, referred to as "rotor position information" or simply "position information") detected by the Hall ICs 21. The control IC 23 also receives the rotation speed command (rotational speed command) that indicates the rotational speed of the rotor 15. On the basis of the magnetic-pole-position signal from the Hall ICs 21 and the rotation speed command from an external device, the control IC 23 generates PWM signals to control the power IC 22 and provides the PWM signals to the power IC 22. The control IC 23 includes an advance-angle calculation unit 200. The advance-angle calculation unit 200 is a constituent unit that generates the rotation speed signal including the rotation speed information on the electric motor 100 and outputs the generated signal to an external device. Moreover, the advance-angle calculation unit 200 is a constituent unit that calculates an advance angle at which operational efficiency of the electric motor 100 becomes maximum, i.e., an optimum advance angle, and calculates an advance angle at which the operational efficiency in a high rotation speed area is improved or an advance angle at which the noise level in the high rotation speed area is reduced. The advance-angle calculation unit 200 will be described later in detail.

As illustrated in FIG. 7, the power IC 22 is configured to include an inverter circuit 114 and an arm driving circuit 116. The inverter circuit 114 includes bridge-connected switching elements 114a to 114f of three pairs of upper and lower arms to drive the three-phase winding 7 (see FIG. 1) in the electric motor 100. The switching elements 114a and 114d among the switching elements 114a to 114f constitute U-phase upper and lower arms. Similarly, the switching elements 114b and 114e constitute V-phase upper and lower arms, and the switching elements 114c and 114f constitute W-phase upper and lower arms.

The connection points of the upper-arm and lower-arm switching elements are led out as AC terminals and are connected to a stator. Meanwhile, the connection point of the upper arms and the connection point of the lower arms are led out as DC terminals and are connected to a rectifier circuit 112. The rectifier circuit 112 converts an AC voltage from a commercial power supply 110 to a DC voltage and applies the DC voltage to the inverter circuit 114. The control IC 23 generates PWM signals to drive the upper-arm and lower-arm switching elements 114a to 114f with PWM and outputs the PWM signals to the arm driving circuit 116. The arm driving circuit 116 includes an upper-arm driving circuit 116a, which drives the upper-arm switching elements 114a to 114c, and a lower-arm driving circuit 116b, which drives the lower-arm switching elements 114d to 114f. The upper-arm driving circuit 116a and the lower-arm driving circuit 116b drive a target switching element on the basis of the PWM signals. The switching elements 114a to 114f are driven, and thereby a DC voltage from the rectifier circuit 112 is converted to a variable-frequency AC voltage. The converted AC voltage is applied to the winding 7 via a winding terminal 24 (see FIG. 1), which electrically connects the driving circuit board 4 and the winding 7, whereby the electric motor 100 is driven.

Figure 8:
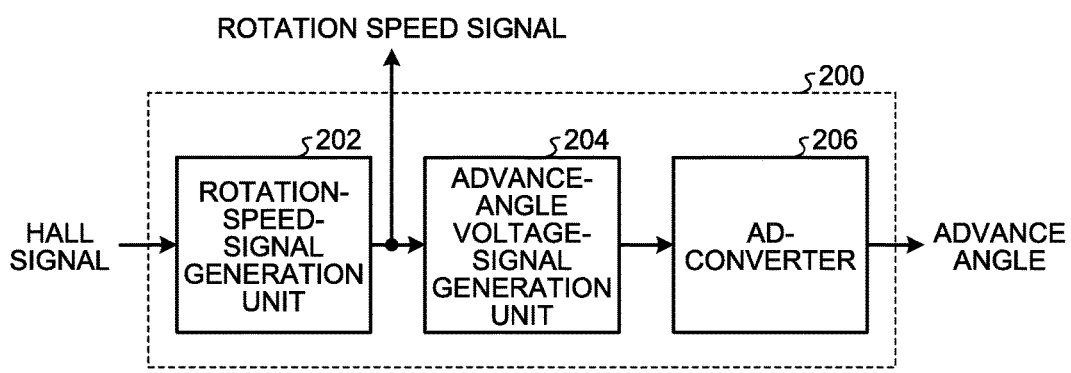
FIG. 8 is a block diagram illustrating the configuration of an advance-angle calculation unit according to the present embodiment.

FIG. 8 is a block diagram illustrating the configuration of the advance-angle calculation unit 200. As illustrated in FIG. 8, the advance-angle calculation unit 200 is configured to include a rotation-speed-signal generation unit 202, which generates the rotation speed signal including rotation speed information on the electric motor 100 on the basis of a Hall signal; an advance-angle voltage-signal generation unit 204, which generates a voltage signal indicating advance angle information on the basis of the rotation speed signal generated by the rotation-speed-signal generation unit 202; and an AD-converter 206, which converts a voltage signal that is an analog signal generated by the advance-angle voltage-signal generation unit 204 to a digital signal indicating advance angle information.

Hall signals output from the Hall ICs 21 are digital signals and are converted to analog signals by the rotation-speed-signal generation unit 202. That is, the rotation-speed-signal generation unit 202 also has a DA-conversion function of converting a digital signal to an analog signal. As described above, the rotation speed signal generated by the rotation-speed-signal generation unit 202 is output to a device outside the advance-angle calculation unit 200 to be used for other controls.

The advance-angle voltage-signal generation unit 204 is a circuit that generates a voltage signal with a voltage value that is proportional to information included in the rotation speed signal, i.e., proportional to the motor rotation speed. The amplitude of the voltage signal generated by the advance-angle voltage-signal generation unit 204 represents a degree of the advance angle. Thus, the AD-converter 206 converts a voltage signal from an analog form to a digital form, and thereby a digital signal indicating the advance angle is output. As described later, an advance angle of an applied voltage to the electric motor 100 is discretely controlled by a digital signal.

Figure 9:
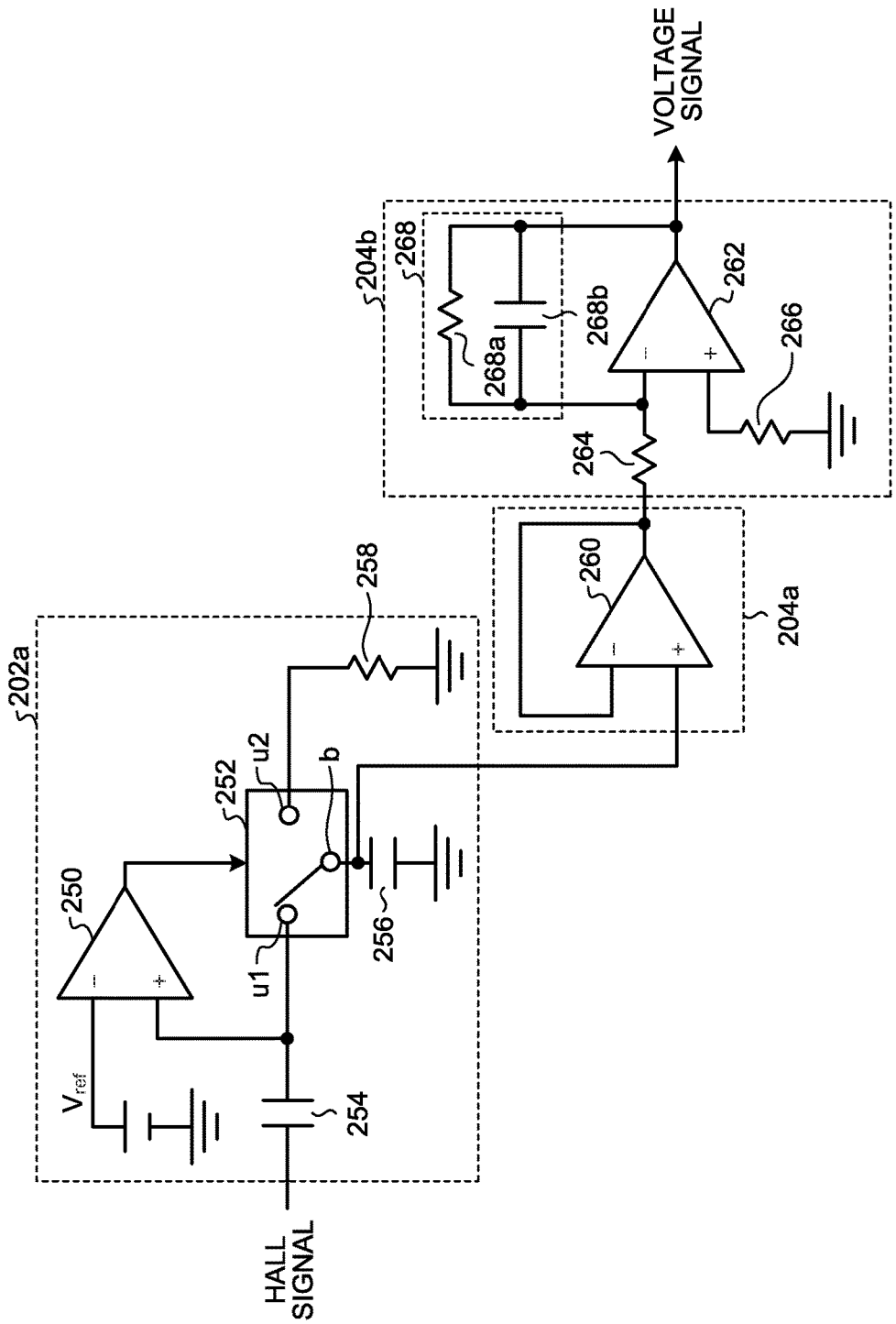
FIG. 9 is a circuit diagram illustrating an example of the circuit configuration to implement a rotation-speed-signal generation unit and an advance-angle voltage-signal generation unit according to the present embodiment.

FIG. 9 is a circuit diagram illustrating an example of the circuit configuration to implement the rotation-speed-signal generation unit 202 and the advance-angle voltage-signal generation unit 204. In FIG. 9, a first circuit block 202a is an example of a circuit to implement the rotation-speed-signal generation unit 202, and a second circuit block 204a and a third circuit block 204b are an example of a circuit to implement the advance-angle voltage-signal generation unit 204.

The first circuit block 202a is configured to include a comparator 250, a selector switch 252, capacitor elements 254 and 256, and a resistor element 258. The first circuit block 202a has a function of converting a Hall signal to a rotation speed signal. The second circuit block 204a is configured to include an operational amplifier 260.

The selector switch 252 is a one-circuit two-contact switch and includes a base point b, a first switching contact u1, and a second switching contact u2. A Hall signal is input to the capacitor element 256 through the capacitor element 254 and the first switching contact u1 of the selector switch 252. Moreover, the Hall signal is input to the positive terminal of the comparator 250 through the capacitor element 254. With this configuration, a voltage divided by the capacitor elements 254 and 256 is applied to the positive terminal of the comparator 250. A reference voltage $V_{ref}$ is input to the negative terminal of the comparator 250. The comparator 250 compares the divided voltage of the Hall signal and the reference voltage $V_{ref}$.

When the divided voltage of the Hall signal is higher than the reference voltage $V_{ref}$, the comparator 250 controls the selector switch 252 such that the first switching contact u1 and the base point b are electrically connected. When the divided voltage of the Hall signal is equal to or lower than the reference voltage $V_{ref}$, the comparator 250 controls the selector switch 252 such that the second switching contact u2 and the base point b are electrically connected.

In the selector switch 252, when the first switching contact u1 and the base point b are electrically connected, a voltage pulse of the Hall signal is applied to the capacitor element 256. Thus, a voltage (charge) is stored (accumulated) in the capacitor element 256 during the period for which a voltage pulse is generated. In contrast, when the second switching contact u2 and the base point b are electrically connected, the capacitor element 256 and the resistor element 258 are electrically connected. Thus, the voltage stored in the capacitor element 256 is discharged through the resistor element 258. The discharge rate depends on a time constant τ that is the product of the capacitance value of the capacitor element 256 and the resistance value of the resistor element 258. As the time constant τ is longer, the discharge rate becomes lower. As the time constant τ is shorter, the discharge rate becomes higher.

In the manner as described above, a voltage is stored in the capacitor element 256 in accordance with the frequency with which a voltage pulse of the Hall signal appears, i.e., in accordance with the period of the Hall signal. As the rotation speed of an electric motor becomes higher, the repeating period of a voltage pulse becomes shorter and thus the stored voltage increases. As the rotation speed of an electric motor becomes lower, the repeating period of the voltage pulse becomes longer and thus the stored voltage decreases.

The divided voltage of the Hall signal stored in the capacitor element 256 is applied to the positive terminal of the operational amplifier 260 in the second circuit block 204a. The output terminal of the operational amplifier 260 is returned to the negative terminal of the operational amplifier 260. The second circuit block 204a constitutes a buffer circuit. The second circuit block 204a that constitutes the buffer circuit enables the first circuit block 202a and the third circuit block 204b to operate without interfering with each other, i.e., to operate without mutually affecting each other.

An output of the operational amplifier 260 in the second circuit block 204a is input to the third circuit block 204b. The third circuit block 204b is configured to include an operational amplifier 262, resistor elements 264 and 266, and a feedback circuit 268, in which a resistor element 268a and a capacitor element 268b are connected in parallel with each other. The third circuit block 204b generates a voltage signal in order to execute the advance angle control described later.

A voltage stored in the capacitor element 256, which is an output from the operational amplifier 260 in the second circuit block 204a, is applied to the negative terminal of the operational amplifier 262 through the resistor element 264. A GND potential (zero potential) is applied to the positive terminal of the operational amplifier 262 through the resistor element 266. The third circuit block 204b, in which the feedback circuit 268 is connected, constitutes an integrator circuit in its entirety. The third circuit block 204b generates a voltage signal such that the ratio of the amount of change in an advance angle to the amount of change in the rotation speed of an electric motor, i.e., the rate of change of an advance angle at the time when the rotation speed of the electric motor is changed, is lower than the conventional technology. It is possible to achieve this control by modifying only the configuration of the control IC 23 as understood from the block diagrams in FIG. 6 and FIG. 8 and the circuit diagram in FIG. 9. Further, it is possible to achieve this control without modifying the AD-converter 206 as understood from the block diagram in FIG. 8.

In the configuration in FIG. 9, the feedback circuit 268, in which the resistor element 268a and the capacitor element 268b are connected in parallel with each other, is a constituent element inside the control IC 23. It is also possible that the feedback circuit 268 is a circuit element externally connected to the control IC 23. Assuming that the feedback circuit 268 is a circuit element outside the control IC 23, the resistance value of the resistor element 268a and the capacitance value of the capacitor element 268b can be changed. Thus, an effect is obtained where advance angle control can be executed in accordance with the specifications of a load to be driven by an electric motor, an application purpose of a device on which the electric motor is mounted, or the installation environment of the device.

Figure 10:
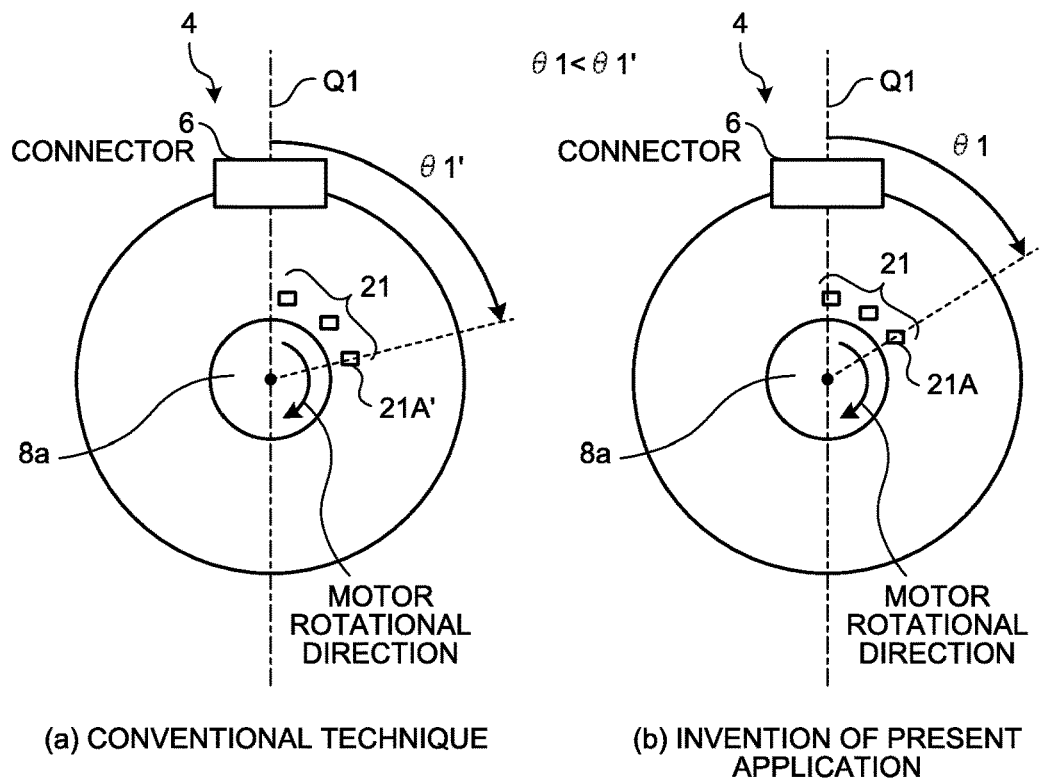
FIG. 10 illustrates diagrams comparing the mounting positions of Hall ICs in a conventional technology and in the present embodiment.

FIG. 10 illustrates diagrams comparing the mounting positions of the Hall ICs in the conventional technology and in the present embodiment. FIG. 10(a) illustrates the mounting positions in the conventional technology. FIG. 10(b) illustrates the mounting positions in the present application. As is apparent from the comparison between FIG. 10(a) and FIG. 10(b), the mounting positions of the Hall ICs are different for each of the conventional technology and the invention of the present application. FIG. 10(a) and FIG. 10(b) illustrate an imaginary line Q1 passing through the center of the through hole 8a by a dot-and-dash line. A Hall IC 21A (the present application) and a Hall IC 21A' (the conventional technology) are both positioned on the leading side in the motor rotational direction. When these Hall IC 21A and Hall IC 21A' are compared, the Hall IC 21A' is located at a position at which the phase angle is zero degrees when the rotation speed of the rotor 15 is zero. An angle θ1 of the Hall IC 21A of the invention of the present application relative to the imaginary line Q1 is smaller than an angle θ1' of the conventional Hall IC 21A' relative to the imaginary line Q1. That is, there is a relation represented by θ1<θ1'. The Hall IC 21A' and the Hall IC 21A are located such that there is a relation represented by θ1<θ1'; therefore, the Hall IC 21A is located at a position at which the phase angle is larger than zero degrees when the rotation speed of the rotor 15 is zero. The phase angle detected by the Hall IC 21A of the invention of the present application leads the phase angle detected by the conventional Hall IC 21A'.

Figure 11:
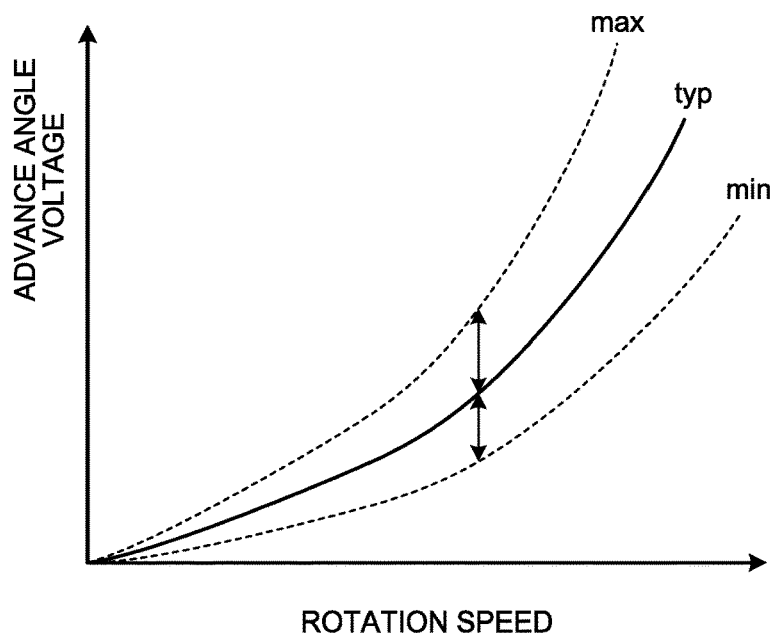
FIG. 11 is a graph illustrating a relation between the rotation speed of an electric motor and an advance angle voltage when the value of the advance angle voltage is relatively large.
Figure 12:
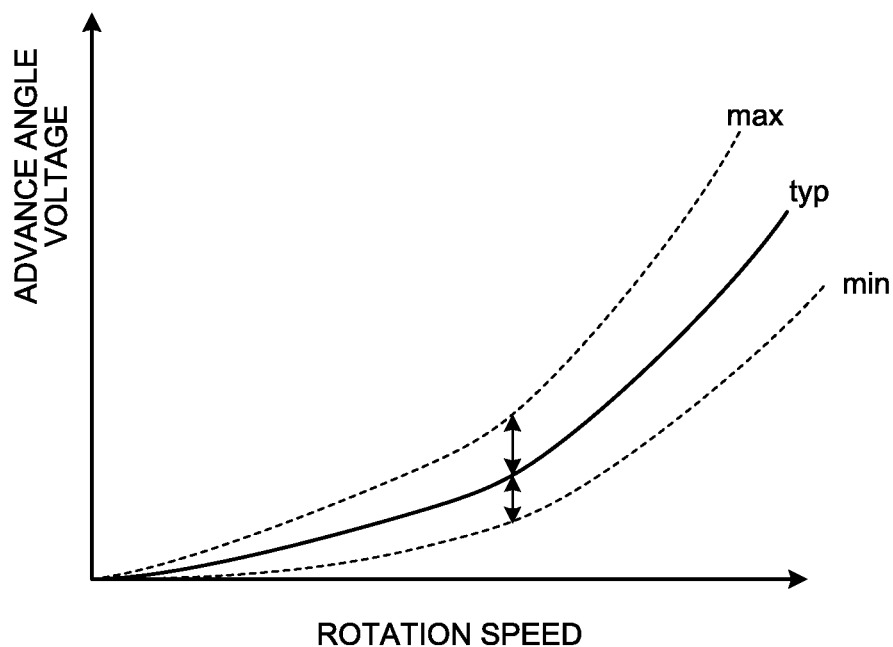
FIG. 12 is a graph illustrating a relation between the rotation speed of the electric motor and the advance angle voltage when the value of the advance angle voltage is relatively small.

FIG. 11 and FIG. 12 are graphs illustrating a relation between the rotation speed of an electric motor and an advance angle voltage. FIG. 11 illustrates the relation when the value of the advance angle voltage is relatively large. FIG. 12 illustrates the relation when the value of the advance angle voltage is relatively small. The advance angle voltage on the vertical axis represents the magnitude of an advance-angle voltage signal generated by the advance-angle voltage-signal generation unit 204 illustrated in FIG. 8.

In FIG. 11 and FIG. 12, a curve "typ" illustrated by a solid line indicates a typical value. Also, an upper curve "max" of the curves illustrated by dotted lines indicates a value obtained by adding +10% to the typical value, while a lower curve "min" indicates a value obtained by adding −10% to the typical value, i.e., a value obtained by subtracting 10% from the typical value.

As illustrated in FIG. 11 and FIG. 12, it is understood that while the advance angle voltage varies about the typical value, the absolute value of variations within a variation range is smaller when the advance angle voltage is smaller. The range between the curve "max" and the curve "min" represents variations in the advance angle voltage on the curve "typ".

Figure 13:
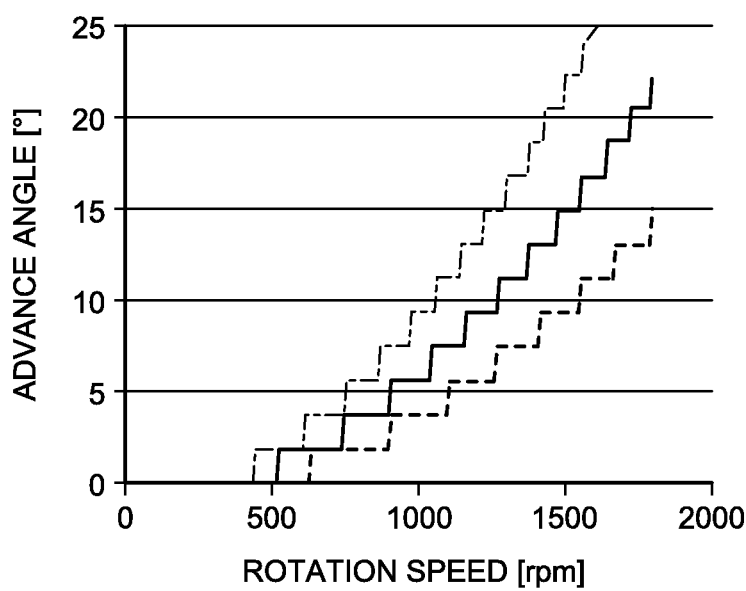
FIG. 13 is a graph illustrating a change in a discrete advance-angle control curve in accordance with the rotation speed of the electric motor.

FIG. 13 is a graph illustrating a change in a discrete advance-angle control curve in accordance with the rotation speed of an electric motor. In the control computation in the present embodiment, the premise is that discrete control is executed by the control IC 23. Thus, the control values for the advance angle control are plotted as a stepped curve as illustrated in FIG. 13. The increase amount of the advance angle (the height of the step on the stepped curve) is determined in accordance with the circuit size. Because this amount is constant, the advance angle is discretely changed. However, it is still possible to cause the rotation speed to change continuously by adjusting the time constant τ that is the product of the resistance value of the resistor element 258 and the capacitance value of the capacitor element 256 in the rotation-speed-signal generation unit 202. In FIG. 13, if the time constant is set longer, the gradient of the advance-angle control curve becomes smaller as illustrated by a dotted line than that of the advance-angle control curve illustrated by a solid line and, if the time constant is set shorter, the gradient of the advance-angle control curve becomes larger as illustrated by a dot-and-dash line than that of the advance-angle control curve illustrated by a solid line.

Figure 14:
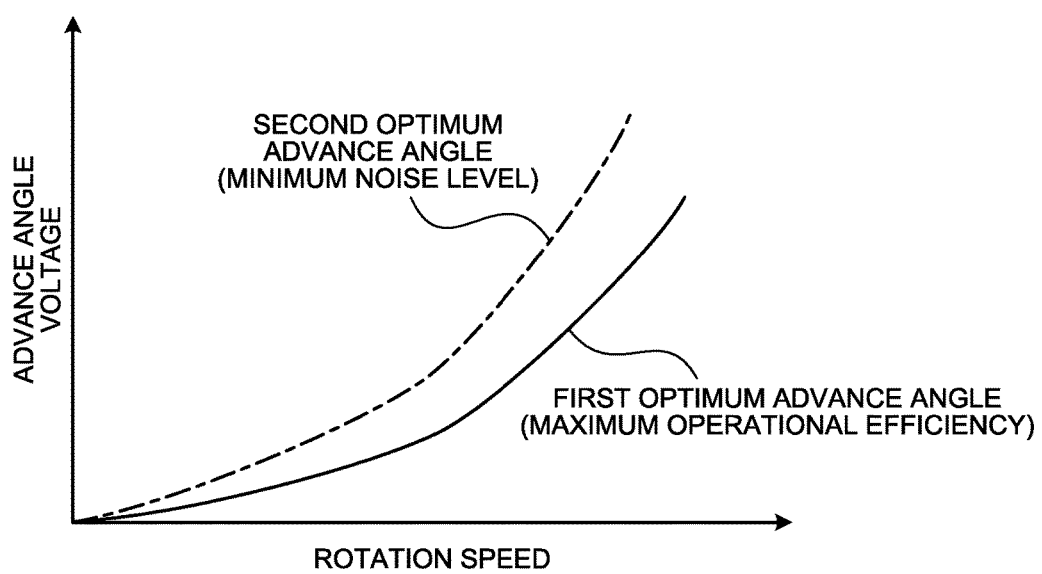
FIG. 14 is a graph illustrating a relation between characteristics of a first optimum advance angle at which operational efficiency of the electric motor becomes maximum and characteristics of a second optimum advance angle at which a noise level of the electric motor becomes minimum, with respect to the rotation speed of the electric motor.

FIG. 14 illustrates an optimum advance angle at which the operational efficiency of an electric motor becomes maximum as a first optimum advance angle and also illustrates an optimum advance angle at which a noise level of the electric motor becomes minimum as a second optimum advance angle. FIG. 14 illustrates characteristics of the first optimum advance angle and the second optimum advance angle as a graph that represents a relation between the rotation speed of the electric motor and the advance angle. As illustrated in FIG. 14, the first optimum advance angle and the second optimum advance angle have characteristics in which the advance angle increases in accordance with an increase in the rotation speed of the electric motor.

Figure 15:
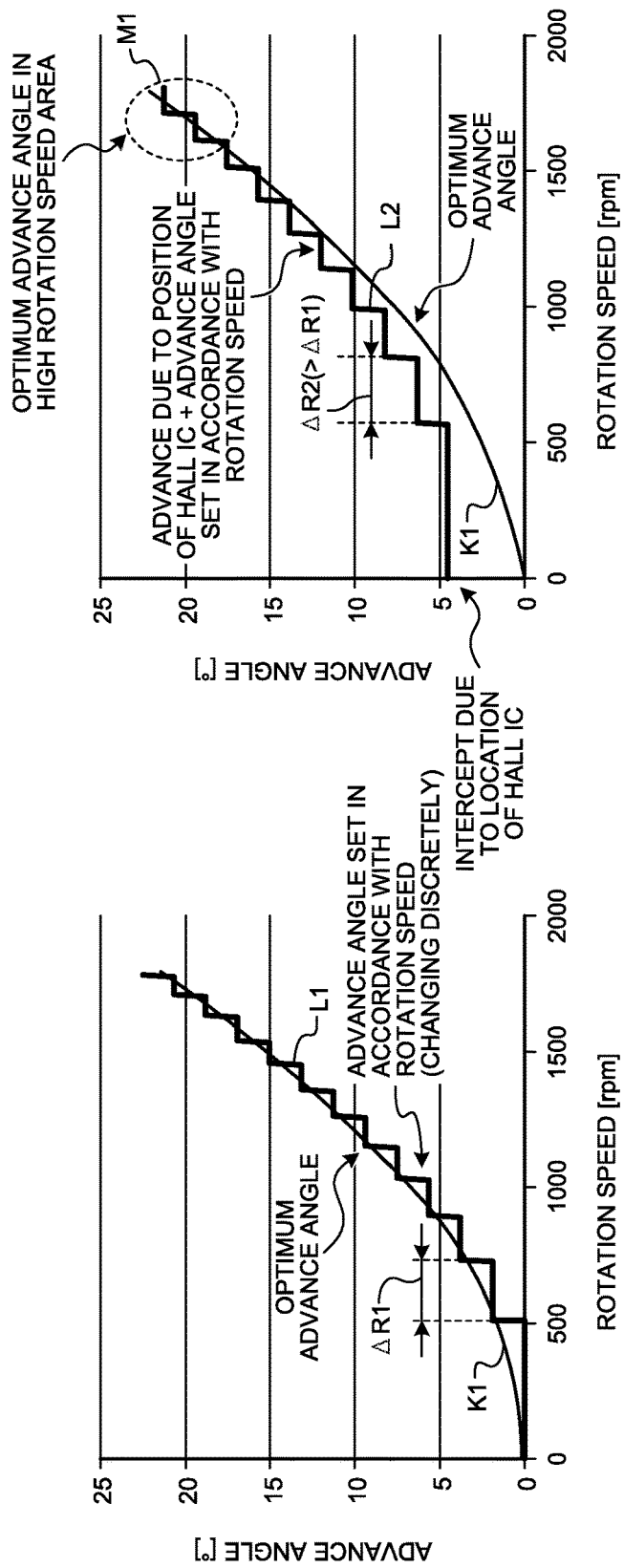
FIG. 15 illustrates graphs comparing optimum advance angle characteristics in accordance with the rotation speed of an electric motor and discrete advance-angle control curves in the conventional technology and in the present embodiment.

FIG. 15 illustrates graphs comparing optimum advance angle characteristics in accordance with the rotation speed of an electric motor and discrete advance-angle control curves in the conventional technology and in the present embodiment. In FIG. 15(a), the advance-angle control curve according to the conventional technology is illustrated together with the optimum advance angle curve. In FIG. 15(b), the advance-angle control curve according to the present embodiment is illustrated together with the optimum advance angle curve. The values plotted on the advance-angle control curve illustrated in FIG. 15(b) are calculated by the advance-angle calculation unit 200 (see FIG. 6 and FIG. 8).

In FIG. 15(a) and FIG. 15(b), a curve K1 illustrated by a thin line represents an optimum advance angle. Further, in FIG. 15(a) and FIG. 15(b), curves L1 and L2 illustrated by a thick line represent a value of the advance angle that is set in accordance with the rotation speed of an electric motor when it is controlled. The relation between the first optimum advance angle curve and the advance-angle control curve is the same as the relation between the second optimum advance angle curve and the advance-angle control curve. Thus, in FIG. 15 and FIG. 16, the first optimum advance angle and the second optimum advance angle are not distinguished from each other, but are referred to as "optimum advance angle".

The following facts are clarified by comparison between FIG. 15(a) and FIG. 15(b). In the following descriptions, the rotation speed of an electric motor lower than 1000 rpm is referred to as "low rotation speed area". The rotation speed of the electric motor in a range from 1000 rpm to 1300 rpm is referred to as "intermediate rotation speed area". The rotation speed of the electric motor equal to or higher than 1500 rpm is referred to as "high rotation speed area". This categorization is merely for the sake of convenience. The numerical values defining the ranges of the low rotation speed area, the intermediate rotation speed area, and the high rotation speed area are not limited to the values described above.

(i) In the intermediate rotation speed area and the high rotation speed area, a value of the advance angle on the conventional curve L1 to calculate an optimum advance angle is changed so as to follow the optimum advance angle curve K1. On the curve L2 in the present embodiment (hereinafter, referred to as "present-application curve" or simply "curve"), a value of the advance angle is changed so as to follow the optimum advance angle curve K1 only in a dotted-line portion M1 that is the high rotation speed area and is changed to a value greater than the advance angle on the optimum advance angle curve K1, i.e., the advance angle is increased relative to the advance angle on the optimum advance angle curve K1, in the low rotation speed area and the intermediate rotation speed area. It is possible to adjust the degree by which the advance angle is increased in the advance angle control, by changing at least one of the resistance value of the resistor element 258 and the capacitance value of the capacitor element 256.

(ii) The gradient of the present-application curve L2 is smaller than the gradient of the conventional curve L1.

(iii) While the intercept of the conventional curve L1 is 0 [°], the intercept of the present-application curve L2 is set to an offset value (approximately 4.6 to 4.7 [°] in the example in FIG. 15(b)). The reason why the offset value appears is that the positions of the Hall ICs 21 are displaced so that the phase angle detected by the Hall ICs 21 leads the phase angle in the conventional technology as illustrated in FIG. 10.

(iv) The rotation speed range ΔR, within which the advance angle on the advance-angle control curve is maintained at an identical value, is wider on the present-application curve L2 than on the conventional curve L1 (for example, ΔR2>ΔR1). The reason for this is that the gradient of the present-application curve L2 is set smaller than the gradient of the conventional curve L1.

When rotational control is executed on an electric motor on the basis of the advance-angle control curve illustrated in FIG. 15(b), the rotation speed range within which the advance angle on the advance-angle control curve is maintained at an identical value is wider than the conventional curve. This makes it possible to stabilize rotational control performed on a load driven by the electric motor. In accordance with the advance-angle control curve illustrated in FIG. 15(b), the advance angle is controlled so as to follow the optimum advance angle curve K1 in the high rotation speed area. Thus, an effect of improving operational efficiency in the high rotation speed area can be obtained.

If the intercept of the present-application curve L2 on the vertical axis, i.e., an offset value, is set excessively large, operational efficiency in the low rotation speed area is reduced. Accordingly, it is preferable to locate the Hall ICs 21 at such positions that the offset value does not exceed 15 [°]. It is more preferable that the offset value is equal to or smaller than 10 [°].

Figure 16:
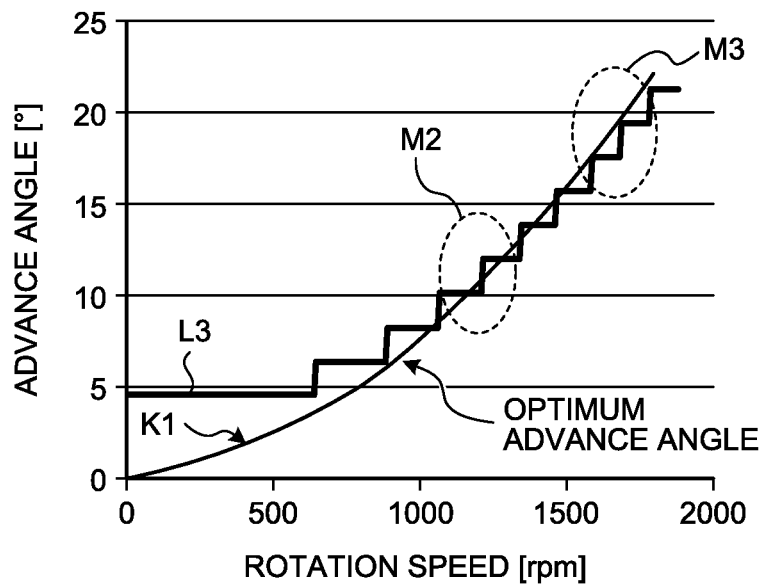
FIG. 16 is a graph illustrating another advance-angle control curve according to the present embodiment.

FIG. 16 is a graph illustrating an advance-angle control curve that is different from FIG. 15(b) according to the present embodiment. In FIG. 16, the optimum advance angle curve K1 is identical to that in FIG. 15(b). The gradient of a curve L3 is smaller than the gradient of the curve L2 illustrated in FIG. 15(b).

As described above, the gradient of the curve L3 is set smaller than the gradient of the curve L2. Thus, in FIG. 16, in a dotted-line portion M2 in the intermediate rotation speed area, the advance angle is controlled so as to follow the optimum advance angle curve K1. Accordingly, an effect of improving operational efficiency in the intermediate rotation speed area can be obtained. Further, in a dotted-line portion M3 in the high rotation speed area, the advance angle is controlled so as to become smaller than the optimum advance angle curve K1. Thus, an effect of reducing the noise level in the high rotation speed area as compared to the conventional technology can be obtained. The gradient of the curve L3 is set smaller than the gradient of the conventional curve L1 illustrated in FIG. 15(a); therefore, it is obviously possible to stabilize rotational control performed on a load as compared to the conventional technology.

Figure 17:
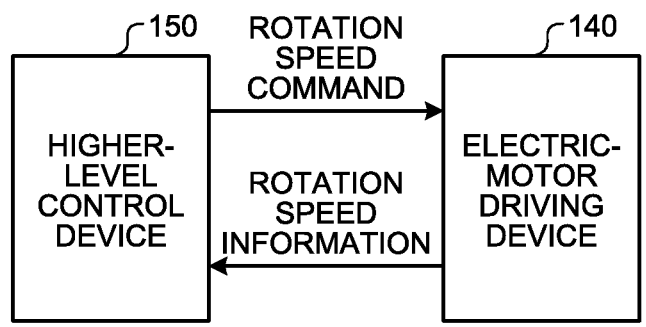
FIG. 17 is a system configuration diagram illustrating a system that drives the electric motor, where the system is divided into an electric-motor driving device and a higher-level control device.
Figure 18:
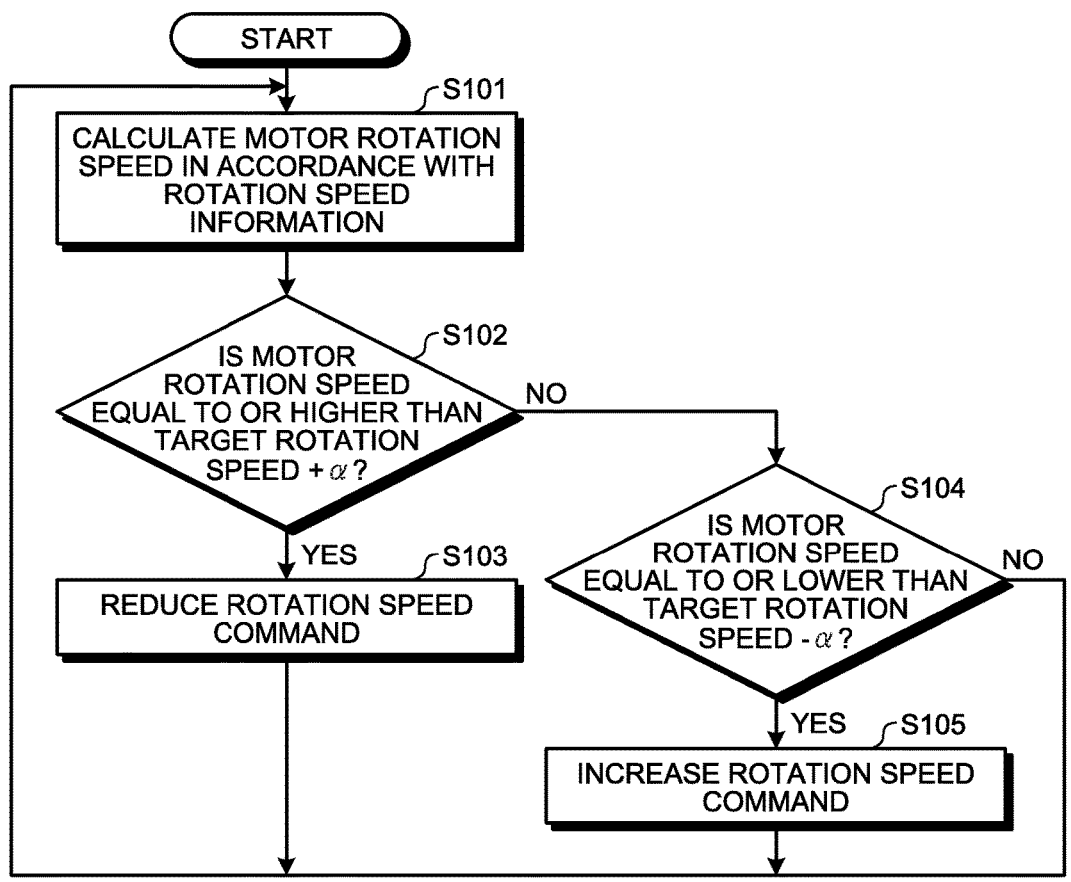
FIG. 18 is a flowchart illustrating a control flow related to rotation speed control on the electric motor executed by the electric-motor driving device and the higher-level control device.

FIG. 17 is a system configuration diagram illustrating a system that drives the electric motor 100, where the system is divided into an electric-motor driving device 140 and a higher-level control device 150. In FIG. 17, the electric-motor driving device 140 is equivalent to the driving circuit board 4 illustrated in FIG. 6, while the higher-level control device 150 is equivalent to a driving circuit board that drives an outdoor unit or a driving circuit board that drives an indoor unit. FIG. 18 is a flowchart illustrating a control flow related to rotation speed control performed on the electric motor 100 by the electric-motor driving device 140 and the higher-level control device 150.

Next, with reference to FIG. 17 and FIG. 18, rotation speed control on the electric-motor driving device 140 will be described. In the following descriptions, the rotation speed of the electric motor 100 is referred to as "motor rotation speed". An allowable range of the rotation speed is defined as a target rotation speed ±α. At this time, the upper-limit value of the target rotation speed is defined as "target rotation speed +α" while the lower-limit value of the target rotation speed is defined as "target rotation speed −α". A typical value for α is, for example, approximately 20 rpm.

As illustrated in FIG. 17, rotation speed information is input to the higher-level control device 150 from the electric-motor driving device 140. The higher-level control device 150 calculates the motor rotation speed in accordance with the rotation speed information (Step S101). The higher-level control device 150 determines whether the motor rotation speed is equal to or higher than the "target rotation speed +α" (Step S102). When the motor rotation speed is equal to or higher than the "target rotation speed +α" (YES at Step S102), the higher-level control device 150 controls the electric-motor driving device 140 so as to reduce the rotation speed command (Step S103). After the control at Step S103, the control flow returns to Step S101.

In contrast, when the motor rotation speed is lower than the "target rotation speed +α" (NO at Step S102), the higher-level control device 150 further determines whether the motor rotation speed is equal to or lower than the "target rotation speed −α" (Step S104). When the motor rotation speed is equal to or lower than the "target rotation speed −α" (YES at Step S104), the higher-level control device 150 controls the electric-motor driving device 140 so as to increase the rotation speed command (Step S105). When the motor rotation speed is higher than the "target rotation speed −α" (NO at Step S104), the higher-level control device 150 skips the control at Step S105. After the control at Step S105 and after "NO" is determined at Step S104, the control flow returns to the process at Step S101 to repeat the aforementioned processes.

As described above, in the electric motor according to the present embodiment, an advance angle is generated such that the rate of change of an advance angle with respect to the rotation speed is lower than the rate of change of an advance angle at which operational efficiency of the electric motor becomes maximum or at which a noise level of the electric motor becomes minimum so as to drive the electric motor. Thus, the electric motor can stabilize rotational control performed on a load while minimizing a cost increase.

The configuration described in the above embodiment is merely an example of the content of the present invention. The configuration can be combined with other well-known technologies, and part of the configuration can be omitted or modified without departing from the scope of the present invention.

Figure 19:
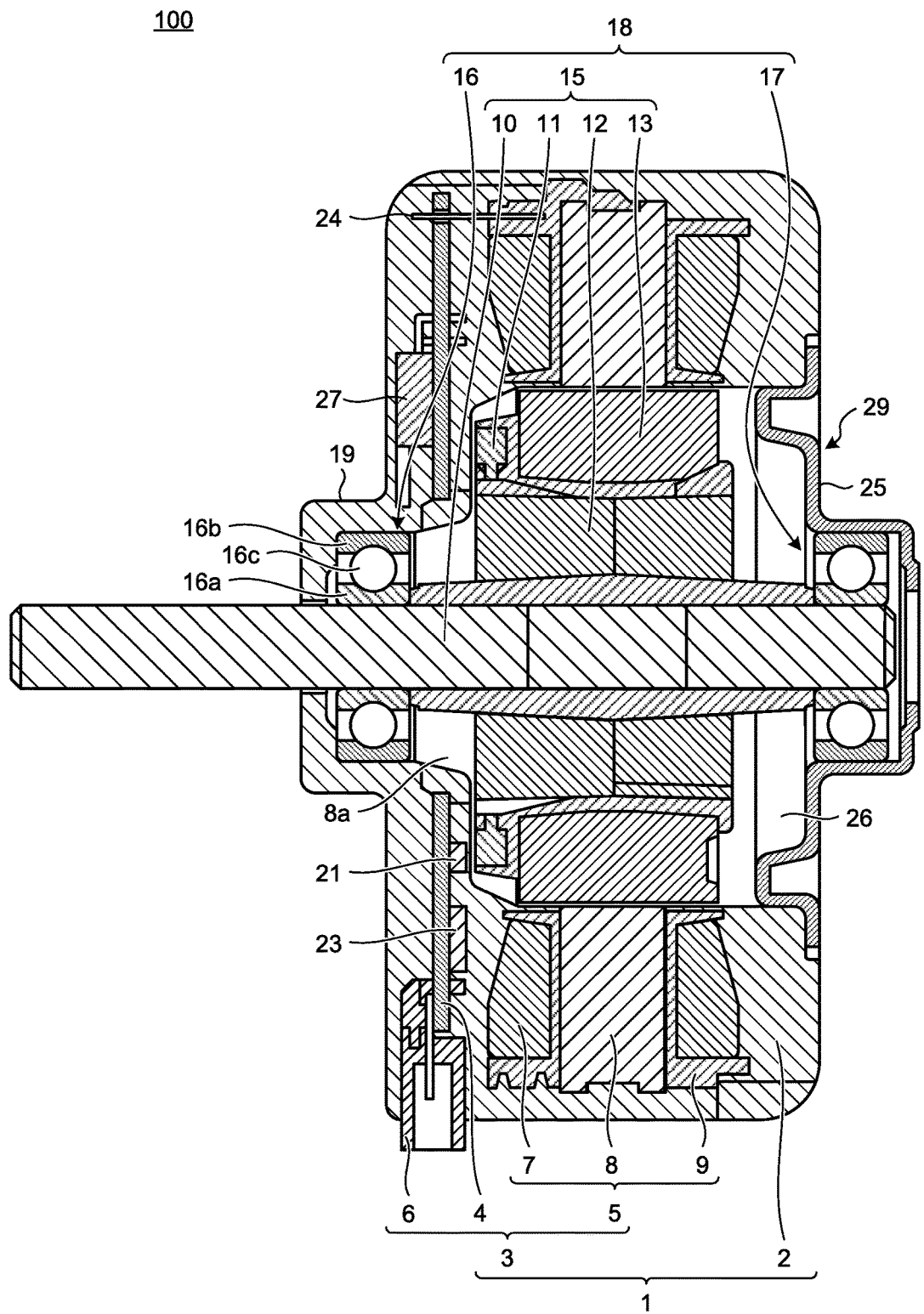
FIG. 19 is a side cross-sectional view illustrating another example of the electric motor according to the present embodiment.
Figure 20:
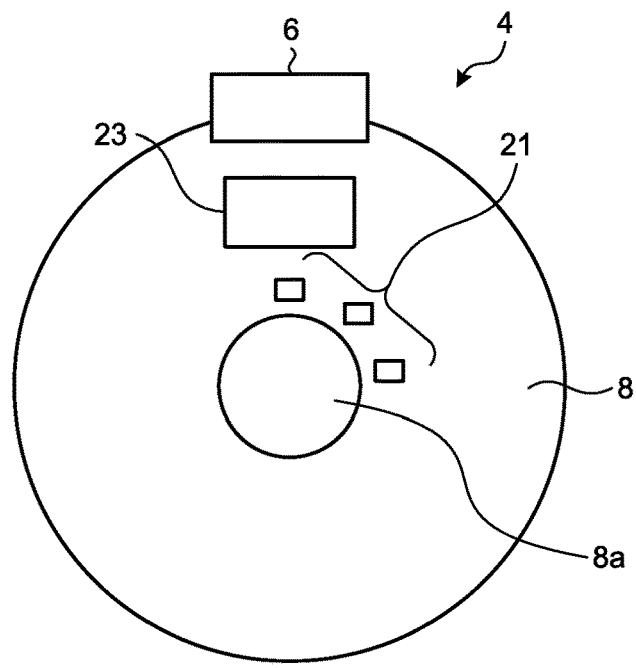
FIG. 20 is a plan view of circuit components mounted on a driving circuit board illustrated in FIG. 19 as viewed from the counter-load side.
Figure 21:
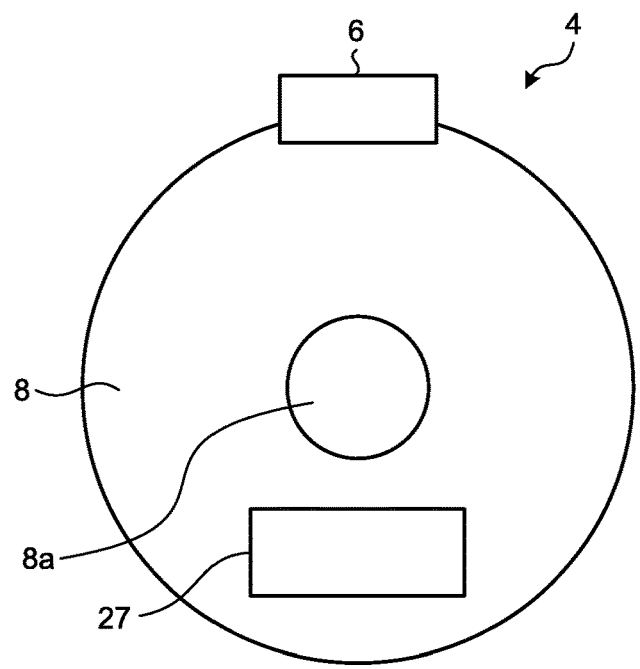
FIG. 21 is a plan view of the circuit components mounted on the driving circuit board illustrated in FIG. 19 as viewed from the load side.

For example, FIG. 19 is a side cross-sectional view illustrating another example of the electric motor according to the present embodiment. FIG. 20 is a plan view of circuit components mounted on the driving circuit board 4 illustrated in FIG. 19 as viewed from the counter-load side. FIG. 21 is a plan view of circuit components mounted on the driving circuit board 4 illustrated in FIG. 19 as viewed from the load side. While the power IC 22, which is a surface mount component, is mounted on the counter-load side in FIG. 1, a power IC 27, which is a lead-type component, is mounted on the load side as illustrated in FIG. 19 and FIG. 21. An electric motor configured as described above is obviously included in the scope of the present invention.

Figure 22:
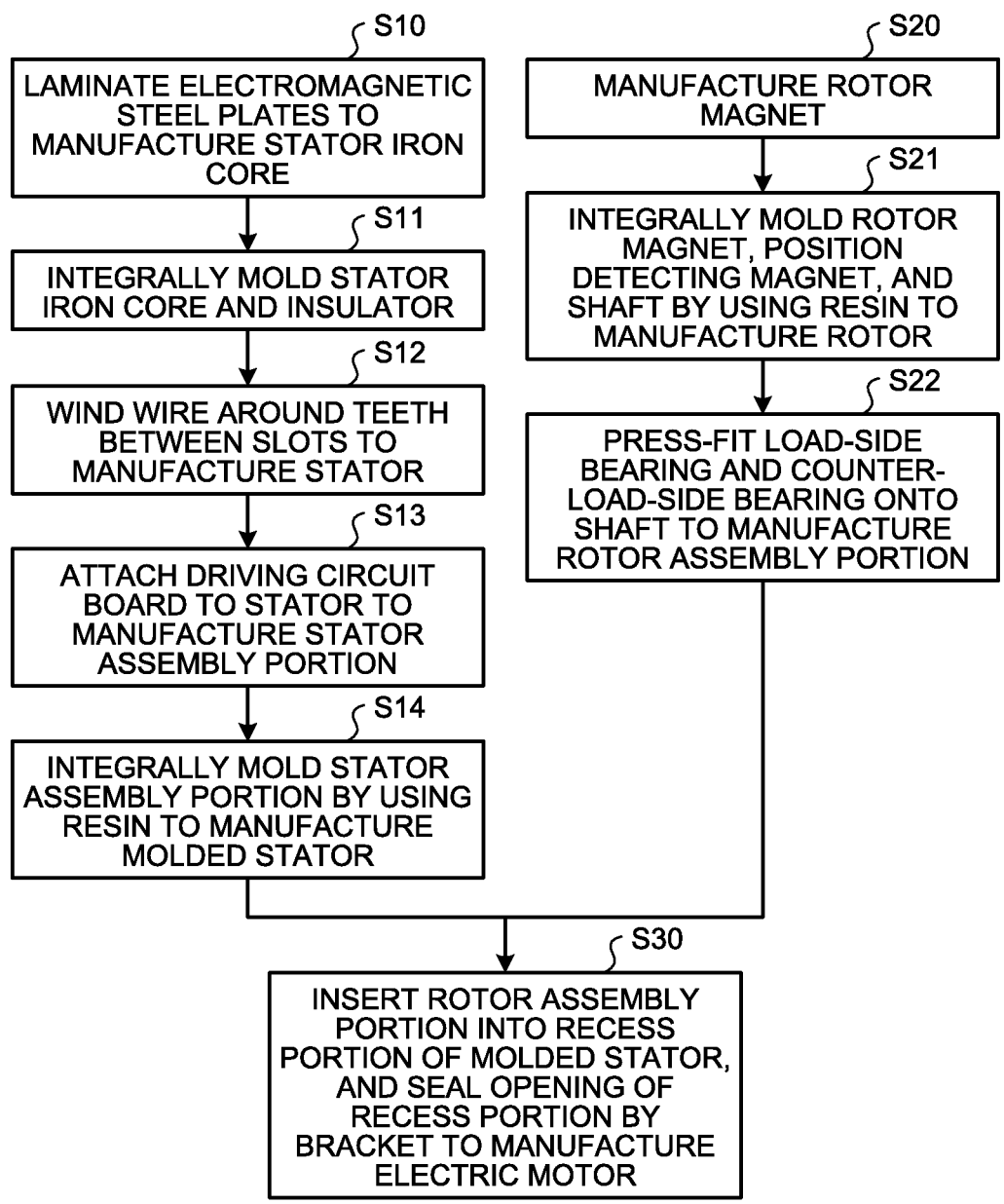
FIG. 22 is a flowchart illustrating a manufacturing method of an electric motor according to the present embodiment.

FIG. 22 is a flowchart illustrating a manufacturing method of an electric motor according to the present embodiment. With reference to the flowchart in FIG. 22, the manufacturing method of an electric motor according to the present embodiment will be described. Indication of reference signs is omitted in FIG. 22.

Steps S10 to S14 are a manufacturing flow of the molded stator 1. At Step S10, electromagnetic steel plates are laminated to manufacture the stator iron core 8. At Step S11, the stator iron core 8 and the insulator 9 are integrally molded. At Step S12, a winding is wound around the teeth between slots of the stator iron core 8 to manufacture the stator 5. At Step S13, the driving circuit board 4 is attached to the stator 5 to manufacture the stator assembly portion 3. At Step S14, the stator assembly portion 3 is integrally molded by using resin to manufacture the molded stator 1.

Simultaneously with manufacturing of the molded stator 1, the rotor assembly portion 18 is manufactured. Steps S20 to S22 are a manufacturing flow of the rotor assembly portion 18. At Step S20, a rotor magnet is manufactured. At Step S21, the rotor magnet 13, the position detecting magnet 11, and the shaft 10 are integrally molded by using resin to manufacture the rotor 15. At Step S22, the load-side bearing 16 and the counter-load-side bearing 17 are press-fitted onto the shaft 10 to manufacture the rotor assembly portion 18.

At Step S30, the rotor assembly portion 18 is inserted into the recess portion 26 of the molded stator 1, and the opening 29 of the recess portion 26 is sealed by the bracket 25 to manufacture the electric motor 100.

By using the manufacturing method of an electric motor according to the present embodiment, for example, the electric motor 100 illustrated in FIG. 1 and the electric motor 100 illustrated in FIG. 19 can be manufactured.

The invention claimed is:

1. An electric motor comprising:
   a stator;
   a rotor provided to be rotatable inside the stator; and
   a board including a driving element applying a driving voltage to the stator, a magnetic-pole-position sensor detecting a rotation position of the rotor, and a control element adjusting a phase of the driving voltage in accordance with a magnetic-pole-position signal from the magnetic-pole-position sensor and rotation-speed information calculated on a basis of the magnetic-pole-position signal, wherein
   the magnetic-pole-position sensor is provided at a position at which an advance angle is larger than zero when a rotation speed of the rotor is zero.

2. The electric motor according to claim 1, wherein the control element outputs an advance angle that follows an optimum advance angle in a high rotation speed area when rotational control is executed on the rotor.

3. The electric motor according to claim 2, wherein
   a resistor element and a capacitor element are provided outside the control element, and
   a degree by which an advance angle is increased in advance angle control is adjusted by changing at least one of a resistance value of the resistor element and a capacitance value of the capacitor element.

4. The electric motor according to claim 1, wherein the control element outputs an advance angle that follows an optimum advance angle in an intermediate rotation speed area when rotational control is executed on the rotor.

5. The electric motor according to claim 4, wherein
a resistor element and a capacitor element are provided outside the control element, and
a degree by which an advance angle is increased in advance angle control is adjusted by changing at least one of a resistance value of the resistor element and a capacitance value of the capacitor element.

6. The electric motor according to claim 1, wherein the control element includes
a rotation-speed-signal generator to generate a rotation speed signal including rotation speed information on the electric motor on a basis of a signal from the magnetic-pole-position sensor,
an advance-angle voltage-signal generator to generate a voltage signal indicating advance angle information on a basis of the rotation speed signal, and
an AD-converter to convert a voltage signal that is an analog signal generated by the advance-angle voltage-signal generator to a digital signal indicating advance angle information.

7. The electric motor according to claim 1, wherein the driving element is mounted on the driving circuit board with a first heat radiation pattern between the driving element and the board,
a second heat radiation pattern is provided on a side of the board on which the driving element is not mounted, and
the first heat radiation pattern and the second heat radiation pattern are connected to each other through a through hole filled with metal.

8. A blower having incorporated therein the electric motor according to claim 1.

9. An air conditioner having incorporated therein the electric motor according to claim 1.

10. An electric motor comprising:
a stator;
a rotor provided to be rotatable inside the stator; and
a board including a driving element applying a driving voltage to the stator, a magnetic-pole-position sensor detecting a rotation position of the rotor, and a control element adjusting a phase of the driving voltage in accordance with a magnetic-pole-position signal from the magnetic-pole-position sensor and rotation-speed information calculated on a basis of the magnetic-pole-position signal, wherein
the magnetic-pole-position sensor is provided at a position at which an advance angle is larger than zero when a rotation speed of the rotor is zero, and
a rate of change of the advance angle with respect to the rotation speed of the rotor is lower than a rate of change of an advance angle at which operational efficiency of the electric motor becomes maximum, or is lower than a rate of change of an advance angle at which a noise level of the electric motor becomes minimum.

11. The electric motor according to claim 10, wherein the control element outputs an advance angle that follows an optimum advance angle in a high rotation speed area when rotational control is executed on the rotor.

12. The electric motor according to claim 11, wherein
a resistor element and a capacitor element are provided outside the control element, and
a degree by which an advance angle is increased in advance angle control is adjusted by changing at least one of a resistance value of the resistor element and a capacitance value of the capacitor element.

13. The electric motor according to claim 10, wherein the control element outputs an advance angle that follows an optimum advance angle in an intermediate rotation speed area when rotational control is executed on the rotor.

14. The electric motor according to claim 13, wherein
a resistor element and a capacitor element are provided outside the control element, and
a degree by which an advance angle is increased in advance angle control is adjusted by changing at least one of a resistance value of the resistor element and a capacitance value of the capacitor element.

15. The electric motor according to claim 10, wherein the control element includes
a rotation-speed-signal generator to generate a rotation speed signal including rotation speed information on the electric motor on a basis of a signal from the magnetic-pole-position sensor,
an advance-angle voltage-signal generator to generate a voltage signal indicating advance angle information on a basis of the rotation speed signal, and
an AD-converter to convert a voltage signal that is an analog signal generated by the advance-angle voltage-signal generator to a digital signal indicating advance angle information.

16. The electric motor according to claim 10, wherein the driving element is mounted on the driving circuit board with a first heat radiation pattern between the driving element and the board,
a second heat radiation pattern is provided on a side of the board on which the driving element is not mounted, and
the first heat radiation pattern and the second heat radiation pattern are connected to each other through a through hole filled with metal.

17. A blower having incorporated therein the electric motor according to claim 10.

18. An air conditioner having incorporated therein the electric motor according to claim 10.

* * * * *